United States Patent [19]
Stoddard et al.

[11] Patent Number: 5,723,787
[45] Date of Patent: Mar. 3, 1998

[54] ACCELEROMETER MOUNTING SYSTEM

[75] Inventors: Damon Rance Stoddard, Seattle; Dale Glen Smith, Snohomish, both of Wash.

[73] Assignee: AlliedSignal, Inc., Morristown, N.J.

[21] Appl. No.: 610,001

[22] Filed: Mar. 4, 1996

[51] Int. Cl.$^6$ ..................................... G01P 1/02
[52] U.S. Cl. ........................... 73/493; 73/514.01
[58] Field of Search .............. 73/493, 497, 514.01, 73/514.16, 514.17, 431, 866.5; 248/683

[56] References Cited

U.S. PATENT DOCUMENTS

| | | | |
|---|---|---|---|
| 4,999,319 | 3/1991 | Hamano et al. | 437/209 |
| 5,233,871 | 8/1993 | Schwarz et al. | 73/493 |
| 5,285,690 | 2/1994 | Koen et al. | 73/727 |
| 5,557,044 | 9/1996 | Foote et al. | 73/497 |

Primary Examiner—John E. Chapman

[57] ABSTRACT

In order to secure a cylindrically shaped inertial instrument transducer such as an accelerometer within a cylindrically shaped housing so as to minimize thermal and mechanical stresses on the transducer, a disk of thermally conductive, compliant adhesive film is used to bond one end of the transducer to the bottom of the housing. The disk can also be composed of a ceramic layer of alumina interposed between two layers of the adhesive film. To provide additional strength, a series of micro dots of epoxy resin located around the periphery of the upper surface of the transducer can be used to bond the transducer to the inner sidewall of the housing.

10 Claims, 1 Drawing Sheet

U.S. Patent     Mar. 3, 1998     5,723,787
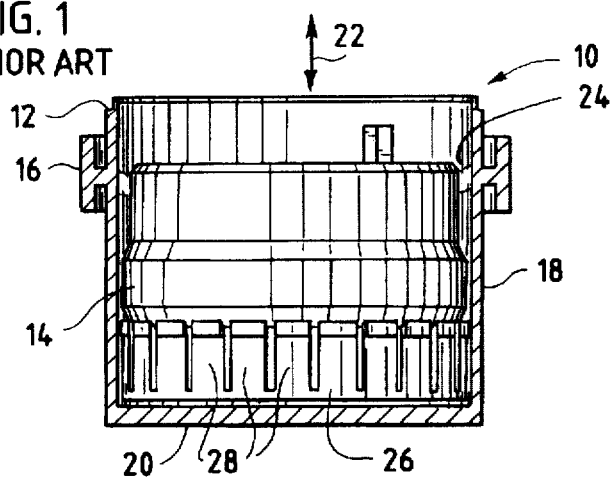
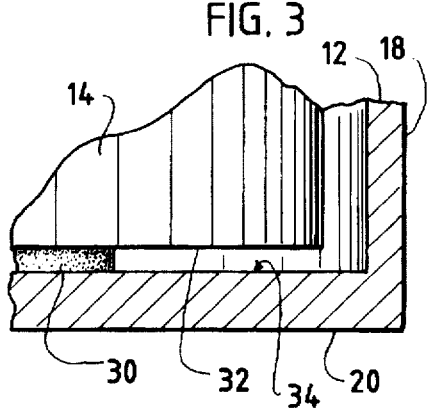
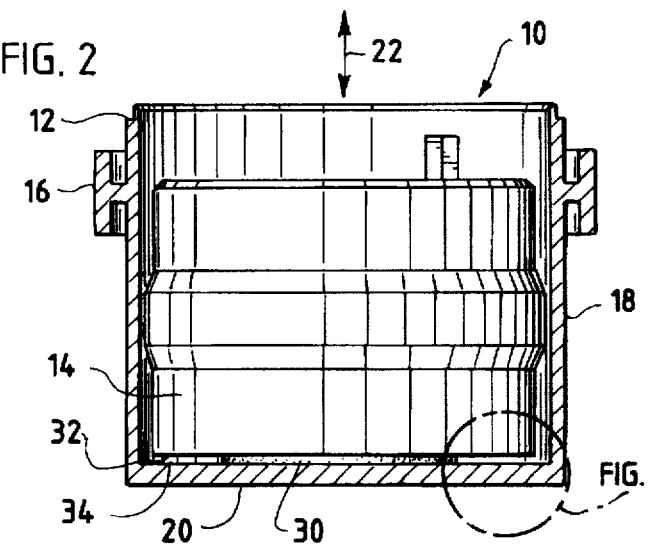
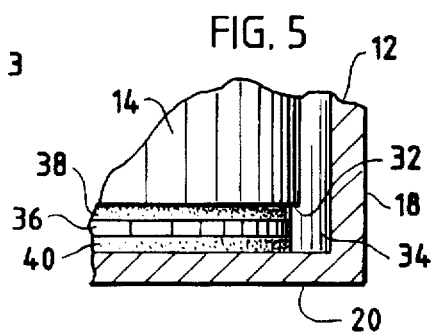
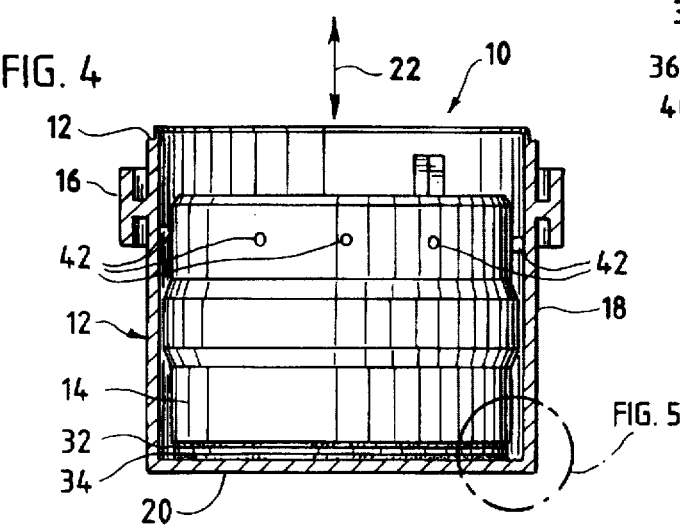

ACCELEROMETER MOUNTING SYSTEM

FIELD OF INVENTION

The invention relates to mounting systems for precision transducers and, in particular, to mounting systems where a transducer is secured within a cylindrical housing.

BACKGROUND OF THE INVENTION

It is desirable to isolate an inertial instrument transducer, such as an accelerometer, from both mechanical and thermal stresses. In the case where a cylindrical shaped transducer is retained within a cylindrically shaped mounting housing, stresses can be caused by mechanical distortion of the housing resulting from external forces or by differential thermal expansion of the housing with respect to the transducer. In addition, it is desirable to eliminate, in so far as possible, mechanical oscillation of the transducer when the housing is exposed to external vibration. At the same time it is very important to maintain accurate alignment of the transducer within the housing so that systems utilizing the transducer can be accurately calibrated.

One method of securing the transducer within the housing is to use a metal or a rigid epoxy resin ring to secure the upper portion of the transducer to the internal sidewall of the housing. This approach tends to result in the transmission of stresses to the transducer due to differential thermal expansion between the transducer, the mounting ring and the housing. Also, it has been found that mechanical stresses are often transmitted via the mounting ring to the transducer as a result of various external conditions. For example, it is often necessary to securely attach the transducer housing to a support structure in a high g or vibrational environment and such mounting methods in themselves can result in mechanical stresses being applied to the housing.

A second method for securing the transducer within the housing, which overcomes many of the problems of the method described above, involves the use of a compliant mounting ring inserted between the transducer and the housing in the bottom of the housing. This mounting ring includes a number of resilient tines that serve to retain the transducer within the housing. A detailed description of the mounting ring is provided in U.S. Pat. No. 5,212,984. However, this method has a number of significant disadvantages including the fact that this type of mounting ring is difficult and relatively expensive to manufacture. Also, because the mounting ring is attached to the transducer by laser welding, the heat generated during the welding operation can affect the heat treatment of the metal parts of the transducer thereby affecting its magnet components resulting in degraded transducer performance. Therefore, in addition to requiring a separate part, this method requires expensive and time consuming assembly and testing in order to produce transducers such as accelerometers with the desired performance specifications.

SUMMARY OF THE INVENTION

According to one aspect of the invention an accelerometer assembly with a cylindrically shaped accelerometer transducer is secured to the bottom of a cylindrical housing with a disk of compliant, thermally conductive adhesive film.

According to another aspect of the invention an accelerometer assembly with a cylindrically shaped accelerometer transducer is secured to the bottom of a cylindrical housing using a disk of ceramic material interposed between two layers of compliant, thermally conductive adhesive film. The disk of ceramic material can include alumina and the adhesive film can be an epoxy resin.

A further aspect of the invention is to provide an accelerometer assembly where an accelerometer transducer is secured within a housing using a thermally conductive adhesive film to secure the transducer to the bottom of the housing along with a series of micro dots of an epoxy bonding resin to secure the upper portion of the transducer to the housing side wall. The adhesive film can be made of the same material as the epoxy bonding agent.

BRIEF DESCRIPTION OF THE DRAWINGS

FIG. 1 is a sectioned side view illustrating prior methods for mounting an accelerometer transducer in a cylindrical housing;

FIG. 2 is a sectioned side view illustrating a first method for mounting an accelerometer transducer in a cylindrical housing according to the invention;

FIG. 3 is an expanded partial detailed view of FIG. 2;

FIG. 4 is a sectioned side view illustrating a second method for mounting an accelerometer transducer in a cylindrical housing according to the invention; and FIG. 5 is an expanded partial detailed view of FIG. 4.

DETAILED DESCRIPTION OF THE INVENTION

FIG. 1 depicts an accelerometer assembly 10 having a generally cylindrical housing 12 for holding a cylindrically shaped accelerometer transducer 14 and provides an illustration of prior methods of securing or mounting the transducer 14 within the housing. In this case, the accelerometer transducer is oriented such that its sensitive axis, as shown by an arrow 22, is coaxial with the housing 12. Operation of the accelerometer transducer 10 is described in U.S. Pat. No. 4,182,187. The housing 12 includes a mounting flange 16 for mounting or securing the accelerometer assembly to a support structure and also includes a cylindrical sidewall 18 and a bottom wall 20 for receiving the transducer 14. One method of securing the transducer 14 within the housing in order to provide stable alignment and to prevent the transducer 14 from undergoing translational or rotational movement within the housing 12 that has been used is to utilize a metal or rigid epoxy ring 24 to attach the transducer 14 to the internal surface of sidewall 18 of the housing 14. Another method that has been used, also illustrated in FIG. 1, is to use a compliant mounting ring 26 having a number of resilient tines 28 to secure the transducer 14 within the housing 12. The disadvantages of these prior methods of securing the transducer 14 within the housing 12 are described above.

FIGS. 2 and 3 illustrate a first embodiment of the invention where the ring 24 or the mounting ring 26 is replaced by a disk of compliant adhesive film 30. The adhesive film 30 serves to attach a bottom surface 32 of the transducer 14 to an inner surface 34 of the bottom wall 20 of the housing 12. Preferably, the adhesive film is a thermally conductive epoxy resin such as ABLEFILM 561K which is available from Ablestick Electronic Materials & Adhesives. As shown in FIGS. 2 and 3, the film disk 30 has a circumference which is less than the circumference of the transducer 14 since it is considered desirable to keep the diameter of the disk 30 as small as possible while maintaining sheer strength. Generally, it is desirable to minimize the contact between housing 12 and the transducer 14 so as to reduce the transmission of stress while at the same time maintaining adequate sheer strength. It should also be noted that shapes other than the circular disk 30 can be used for the adhesive bonding film such as a donut or a star shaped configuration. The mounting arrangement shown in FIGS. 2 and 3 utilizing a disk of compliant epoxy 30 has a number of very significant advantages including the fact that it provides a method for isolating thermally induced stress without the need for a separate part such as the mounting ring 26 shown in FIG. 1. In addition, since it is not necessary to do laser welding, which can affect the heat treatment of the housing, the mounting arrangement of FIGS. 2 and 3 should have minimal effect on the accuracy of the accelerometer 14. Also, because this method does not use resilient tines 28 as shown in the mounting ring 26, insulation resistance failures will not be a problem and because a separate part is not used, manufacturing and testing costs can be substantially reduced.

FIGS. 4 and 5 illustrate a second embodiment of the invention where a ceramic disk 36 placed between two adhesive disks 38 and 40 is used to secure the accelerometer transducer 14 to the inner surface 34 of the bottom wall 20 of the housing 12. Preferably, the ceramic disk 36 is primarily composed of alumina and the adhesive disks 38 and 40 are of the same material as the disk 30 shown in FIGS. 2 and 3.

In certain circumstances, it may also be desirable to provide additional stability so as to compensate for cross-axis vibration by utilizing a series of micro dots of epoxy resin, indicated by reference numeral 42 in FIG. 4, located around the periphery of the upper surface of the transducer 14 to bond the upper portion of the transducer 14 to the side wall 18 of the housing 12. It should be noted that the micro dots 42 can also be used in the accelerometer assembly 10 shown in FIG. 2. By using the micro dots 42, the mounting of the accelerometer 14 in the housing 12 can be made more longitudinally stable along the sensitive axis 22 while minimizing thermal stress.

What is claimed is:

1. An accelerometer assembly comprising:

a transducer housing having a cylindrical sidewall and generally planar bottom wall secured to said sidewall;

a generally cylindrical accelerometer transducer coaxially located within said transducer housing and having a first end disposed to said bottom wall; and a thermally conductive compliant adhesive film interposed between said first end of said accelerometer transducer and said bottom wall for bonding said accelerometer transducer to said transducer housing.

2. The assembly of claim 1 wherein said adhesive film is an epoxy resin.

3. The assembly of claim 2 wherein said adhesive film is Ablefilm 561K film.

4. The assembly of claim 1 wherein said adhesive film is configured as a disk having a diameter less than the diameter of said accelerometer transducer.

5. The assembly of claim 1 additionally including a plurality of micro dots of an epoxy bonding resin spaced radially around an upper portion of said housing sidewall for securing the upper portion of said accelerometer transducer to said housing sidewall.

6. The assembly of claim 5 wherein said epoxy bonding resin is the same material as said adhesive film.

7. An accelerometer assembly comprising:

a transducer housing having a cylindrical sidewall and generally planar bottom wall secured to said sidewall;

a generally cylindrical accelerometer transducer coaxially located within said transducer housing and having a first end disposed to said bottom wall;

a thermally conductive compliant adhesive film interposed between said first end of said accelerometer and said bottom wall for bonding said accelerometer transducer to said transducer housing; and a ceramic material located intermediate of said adhesive film.

8. The assembly of claim 7 wherein said ceramic material includes alumina.

9. The assembly of claim 7 additionally including a plurality of micro dots of an epoxy bonding resin spaced radially around an upper portion of said housing sidewall for securing the upper portion of said accelerometer transducer to said housing sidewall.

10. The assembly of claim 7 wherein said adhesive film and said ceramic material are configured as a disk having a diameter less than the diameter of said accelerometer transducer.

* * * * *